INVENTOR.
LILEY A. EVANS

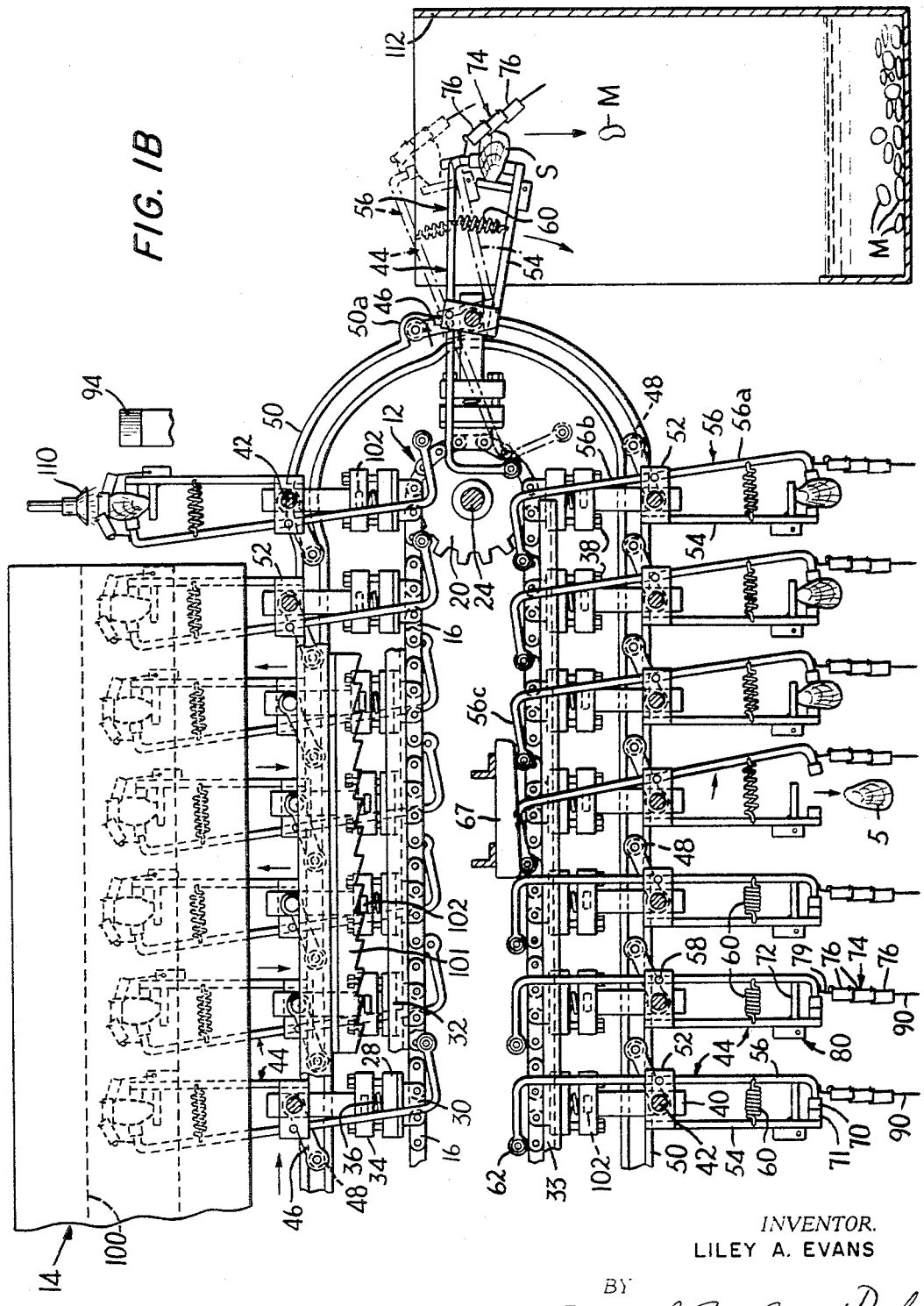

INVENTOR
LILEY A. EVANS her ATTORNEYS

United States Patent Office 3,473,191
Patented Oct. 21, 1969

3,473,191
APPARATUS FOR SHUCKING BIVALVES
Liley A. Evans, 13 Lloyd Haven Drive,
Huntington, N.Y. 11743
Filed May 31, 1967, Ser. No. 642,520
Int. Cl. A22c 29/00
U.S. Cl. 17—74                                15 Claims

ABSTRACT OF THE DISCLOSURE

A method of, and apparatus for, shucking bivalves comprising the steps of, and the means for, exposing the bivalves for a predetermined time between 2 and 25 seconds to an atmosphere heated to a predetermined mean temperature between 1200° F. and 2000° F. (the specific time and temperature being dependent on the species and characteristics of the bivalves) and imparting a thrusting or shaking motion to them during at least the final phase of exposure. During the heat exposure the hinge and bill portions are shielded from the radiant heat from the heating chamber walls to avoid searing the bill tissues and the hinge ligament so that the ability of the shell to open relatively freely at or near the end of the heating time is not impaired.

BACKGROUND OF THE INVENTION

This invention relates to a method of and apparatus for shucking bivalves and, more particularly, to a method and apparatus by which the animal can be removed from the shell alive and in good condition.

There are many low cost, efficient ways of removing the animals, or meats, of various bivalves, such as clams, oysters, scallops and the like, in which the meat is cooked. Generally, bivalves will open when they are steamed or otherwise cooked so as to kill the animal and thereby relax and release the powerful adductor muscle by which the shell halves are very strongly held together whenever the animal is out of its natural environment. While cooked oysters, clams and the like are popular, cooking tends to destroy some of the flavor and for this and other reasons, many people prefer to eat them raw, particularly oysters.

Many attempts have been made to provide machines for opening bivalves without mutilating or cooking the animal so that it is recovered alive and in good condition. Some proposed machines have utilized a heating step to effect a detachment of the animal, principally its adductor muscle, from the shells. Despite much work on various machines, experience has proven that hand-shucking has been the only sure way of recovering bivalve meats without killing them or without damaging them to an extent that they die relatively quickly and have a shelf life which is too short to permit practical utilization. Thus, hand-shuncking continues to be the predominant method of recovering live bivalve meats. The high costs of labor and the difficulty of obtaining skilled shuckers has made it all the more important for a practical, efficient method and machine to be developed.

SUMMARY OF THE INVENTION

There is provided, in accordance with the invention, a novel and improved method of and apparatus for shucking bivalves embodying several features which have been found to be important for providing an economical, effective machine. The apparatus of the invention can be designed for rapid and trouble free operation and, more importantly, separates the animal from the shell alive and in substantially unharmed condition such that it will have a shelf life of a duration approaching that of hand-shucked bivalves.

The method of the invention comprises the steps of exposing the bivalve to an atmosphere heated to a predetermined mean temperature within the range of from about 1200° F. to about 2000° F. for a predetermined time between about 2 seconds and 25 seconds to heat the shell and cause the animal to be completely detached from the shell. Heating is preferably accomplished in a chamber which exposes the bivalves not only to the hot gas in the atmosphere of the chamber but also to the radiant heat of the chamber walls. Under controlled conditions of time and temperature, the animal can be released from the shell by singeing away the surface tissues by which it is attached to the shell without significantly heating or cooking the animal itself. To accomplish this, however, the time and temperature must be closely controlled and have been found to be inter-related. The particular combination of time and temperature is dependent upon the particular bivalve being processed. Such factors as the species, the size, and the geographical area, and even the particular bed, from which the bivalves are harvested bear directly and significantly upon the time and temperature conditions.

Although it is generally not absolutely necessary to do so, it has been found that much better results are obtained if the bivalve is subjected to continual thrusting or shaking movement during the heating step, at least the final portion of the heating step. Preferably, the principal direction of shaking is along an axis through the hinge and bill of the bivalve. The shaking should be vigorous enough to provide a peeling action, that is, to more or less peel the animal away from the shell, and yet should not be so violent as to cause tearing or bruising of the animal. In addition to playing an active role in releasing the animal tissues and muscles from the shell, the continual movement of the bivalve keeps the animal from resting too long in any one position in the shell, thereby inhibiting heat transfer by conduction from the shell to the animal and preventing the possibility of isolated burning and sticking of the animal in the shell.

During the heating step, the hinge (or dorsal) and bill portions of the shell are protected or shielded from heating so that the dorsal ligament and the tissues at the bill of the shell (which is relatively thin) are not singed or burned. By protecting the dorsal ligament, the ability of the shell to open itself by normal operation of the ligament is preserved, thereby making it unnecessary to mechanically pull open the shell after the adductor muscle has been detached from the shell halves. By protecting the bill portion, the tissues and parts of the shell where the two halves come together are prevented from being seared together, which would otherwise tend to keep the shell from opening. Because the heat transfer involved in the method is substantially by radiation, good results are obtained by merely keeping the hinge and bill parts of the bivalve covered by a suitable shielding element to create a shadow over them.

During the heating step the shells should not be allowed to open in order to prevent the animal from being directly exposed to the heat; such exposure would of course quickly burn the animal so that it would be killed or fatally injured. The bivalves may not tend to open during the heating, but if they do, a suitable mechanical means may be provided to keep them closed. Desirably, such a mechanical meanse can also operate as a shield for the bill to protect it from the heat. Upon leaving the heating oven, any mechanical hold on the shell keeping it closed is released so that the hinge ligament of the bivalve can open it. It has been found that spraying the shell with water immediately upon emerging from the oven appears to assist in opening the shell; the beneficial effect of the water spray has been observed, but the reason for its effectiveness is not well understood at present.

Inasmuch as the heating of the bivalve, together with the thrusting or shaking movement during heating, entirely or substantially entirely releases the animal from the shell, the animal can readily be removed. Preferably, removal is accomplished by imparting a thrusting or shaking motion to the shell sufficient to propel or shake the animal out through the open end or the side edge of the shell. The animal may be ejected or dropped directly into a wash tank for the required washing operation and may thereafter be packed in the usual manner for shipment and sale.

In a preferred form of the apparatus of the invention, the heating step is carried out in a tunnel type oven, the bivalves being conveyed through the oven by an endless chain-type conveyor which carries a multiplicity of holders. The holders include gripper elements arranged to grip only one shell half, leaving the other shell half free, and hold the bivalve with the hinge end down and the bill end up. The holders may include scissor-like arms urged to a closed position with sufficient force to grip and hold the shell throughout the shucking operation and preferably include a mechanism for opening the gripper elements to receive the bivalves at a point upstream of the oven.

Associated with the holders are shielding elements for protecting the hinge portion and bill portion of the bivalve. The shield for the bill portion may, for example, consist of a chain-link mesh or a number of V-shaped elements linked together in a chain which can be pulled across the bill and will conform to bivalves of various shapes and sizes. This form of shield structure can perform the dual function of both shielding the bill portion of the bivalve and also wedging the shell halves together to keep them closed during the heating operation, one end of the chain of shield elements being hinged to one of the holder members and the other end being arranged to be releasably secured to enable the V-shaped members to hold the shell closed. Upon leaving the oven, the releasably held end can be uncoupled so that the shell is permitted to open. In many cases it suffices to merely lay the shield structure across the bill, in which case it does not restrain the shell from opening. Whether or not the shield also keeps the shell closed, a slight opening of the shell or opening near the end of the heating stage may not be a problem since the shield protects the animal from the radiant heat and will usually prevent damage to it.

The machine further comprises mechanisms for imparting thrusting or shaking motion to the holders during at least the final phase of the heating step to provide the peeling action which assists in detaching the animal from the shell and for providing a thrust to the holders to eject the animal after the shell is opened. The shell remains in the holder and is carried by it to a shell removal station where the gripper elements are opened and the shell dropped onto a conveyor or otherwise collected for disposal. The holders then return to the starting point. During the return traverse of the holders, they can be sprayed with water to cool them and to clean away any shell particles, sand or the like that might have become lodged in various parts of the holder.

Although the machine and method are particularly advantageous in recovering bivalve meats alive and in good condition to ensure a relatively long shelf life, they also can be adopted for a cooking process, say in a canning operation or the production of soups. The temperature and duration of heating can be altered to not only release the animals from their shells and open the shells but also to cook the animals. In addition to quickly and efficiently cooking and releasing the meats and opening the shell in a quick and efficient machine-operation, the invention affords the advantage of a continuous, constant rate output, as compared to the usual batch-cooking process generally used.

BRIEF DESCRIPTION OF THE DRAWINGS

For a better understanding of the invention, reference may be made to the following description of an exemplary embodiment, taken in conjunction with the figures of the accompanying drawings, in which:

FIGS. 1A and 1B together make up a side view in section of the shucking apparatus of the invention, the section being taken generally along the longitudinal axis of the machine, FIG. 1A showing the left portion and FIG. 1B showing the right portion;

As will be apparent upon observing the drawings, most parts of the machine on either side of longitudinal center plane are identical, except for being reversed in lateral orientation; therefore, the same reference numerals will be used to designate the corresponding parts.

DESCRIPTION OF EXEMPLARY EMBODIMENT

Figure 1A:
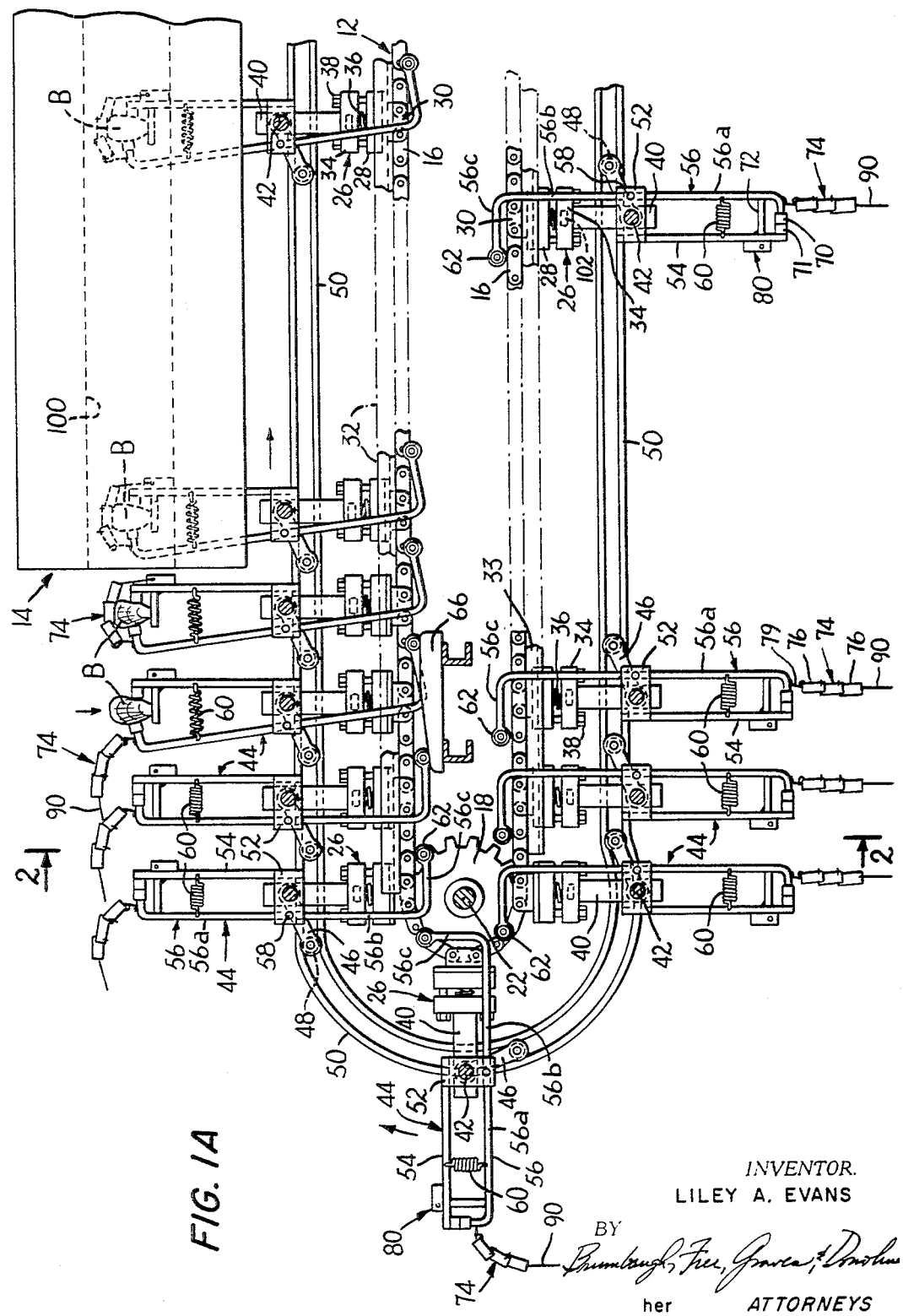
Figure 2:
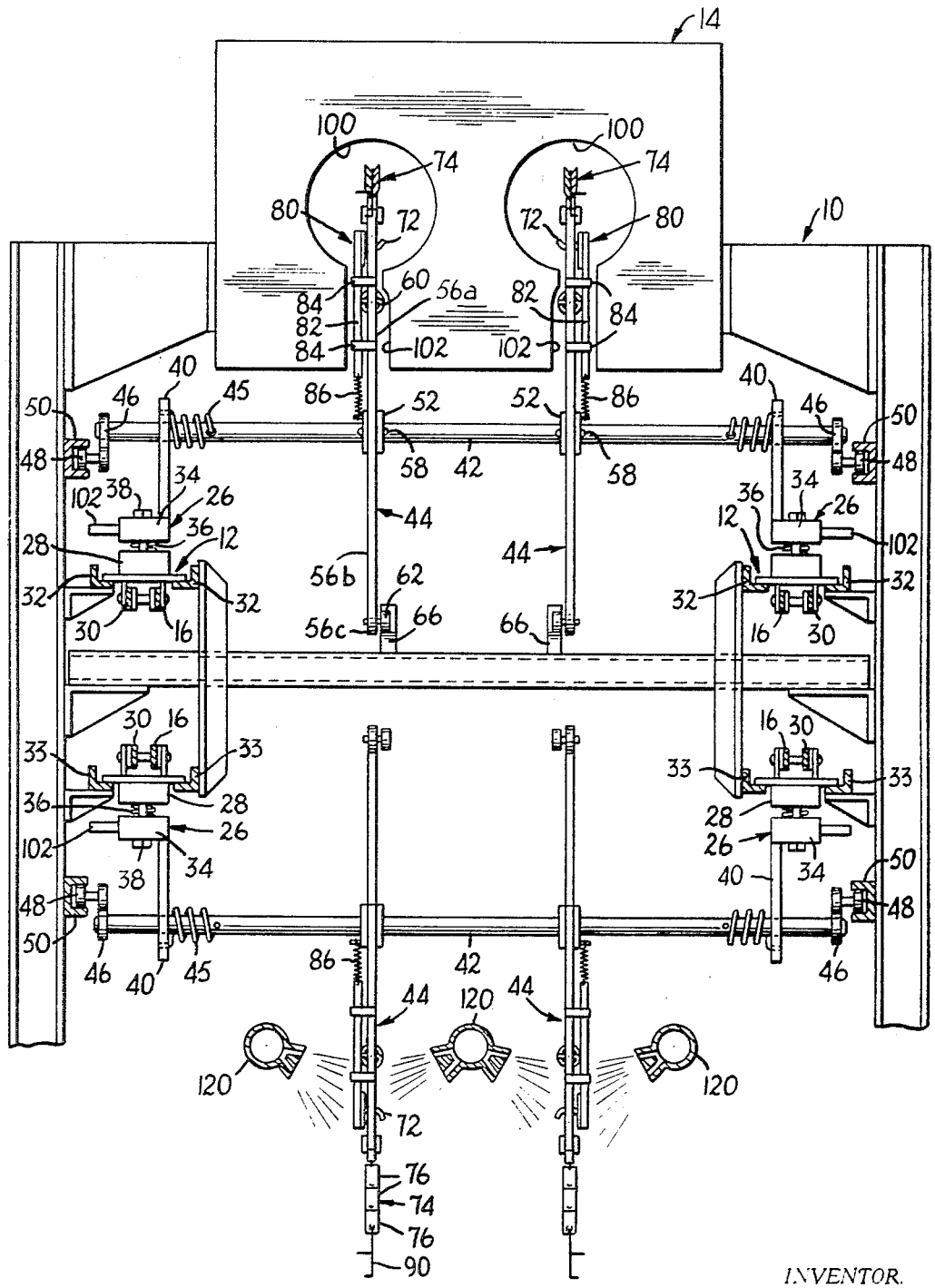
FIG. 2 is an end view in section of the machine, the view being taken generally along a plane defined by the lines 2—2 of FIG. 1A and in the direction of the arrows.

Referring to FIGS. 1A, 1B and 2, the machine includes a suitable frame, designated generally by the reference numeral 10, carrying an endless chain-type conveyor 12 and supporting an electrically heated tunnel type of oven 14 located above the major portion of the upper traverse of the conveyor 12. The conveyor 12 includes endless link chains 16 on each side of the machine guided around sprockets 18 and 20 carried by rotatable transverse shafts 22 and 24, one of which is driven by a suitable power train (not shown). Coupled to the chains 16 are carrier members 26 which are composed of base pieces 28 attached by couplings 30 to spaced links of the chain and supported on upper and lower tracks 32 and 33 mounted on the frame, and mounting pieces 34 which are urged away from the base pieces by springs 36 but are stopped and guided by bolts 38.

Each mounting piece 34 of the carriers 26 has an upstanding member 40, and the members 40 on each transverse pair of carriers rotatably receive and support a transverse rod 42 which carries a pair of spaced-apart bivalve holders 44. Coil springs 45 associated with the members 40 and the shaft 42 exert a torque on the shaft in a clockwise direction, with respect to the view of the holders in FIG. 1A or 1B. At the ends of each shaft 42 are crank arms 46 which have cam follower wheels 48 at their outer ends. Endless cam tracks 50 guide the cam followers 48 along a path effective to maintain a predetermined angular orientation of the holder members 44 with respect to the conveyor, as will be described in more detail below.

Each of the bivalve holders includes a bracket element 52 secured to the shaft 42, an upwardly extending fixed arm 54 and a pivotably mounted arm 56. The pivotable arm 56 includes an upper portion 56a above its mounting pin 58 which is pulled toward the fixed arm 54 by a spring 60 and a lower portion 56b having a forwardly extending lever arm 56c which carries a cam follower wheel 62. Normally, the spring 60 pulls the holder arms to a closed or gripping position, the cam follower 62 normally being free and unguided. However, at two points along the path of the conveyor, cam bars 66 and 67 engageable with the follower rotate the movable arm 56 in a counterclockwise rotation (with respect to the view of the holders in FIGS. 1A and 1B) to separate the arms 54 and 56 against the spring 60. The cam 66 opens the holder to permit a bivalve, designated by the letter B, to be inserted into the holder in a manner to be described below, while the cam 67 opens the holders to release the shells S after the animals or meats M have been removed.

Figure 3:
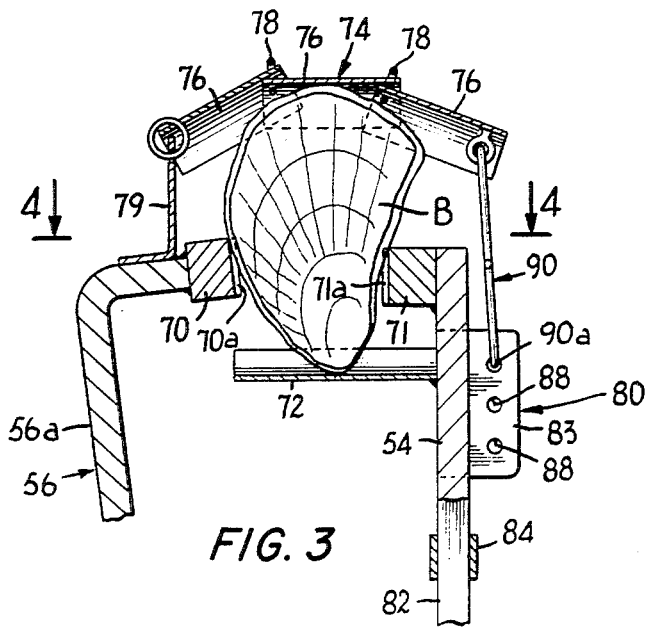
FIG. 3 is a side elevational view of the upper portion of a holder, the view being on a larger scale than FIGS. 1A, 1B and 2.
Figure 4:
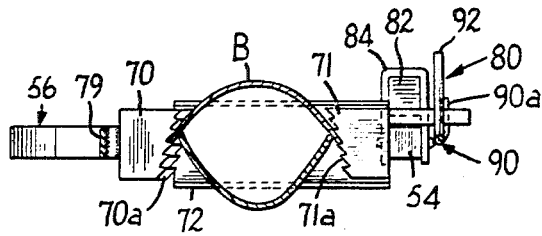
FIG. 4 is a top view of the bivalve holder, also on a larger scale.
Figure 5:
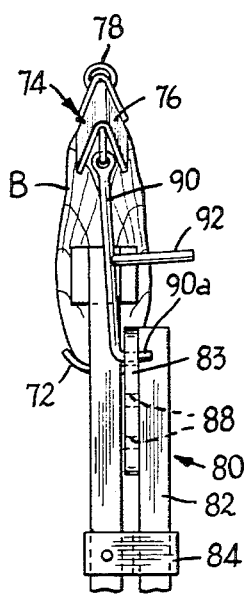
FIG. 5 is a front view of the upper part of a holder on the scale of FIGS. 3 and 4.

Referring to FIGS. 3 to 5, the fixed and pivotable holder arms 54 and 56 have cooperating toothed gripper heads 70 and 71. The opposed, tooth faces 70a and 71a of the heads are angularly related such that they will grip only one shell half. In some bivalves, particularly oysters, one of the shell halves is larger and the edges of that half extend beyond the edges of the other half, thereby making it relatively easy to provide for gripping of only one shell half. The reason for gripping only one-half of the shell is to permit the shell to open after the heating step. Nevertheless, it is desirable to have the shells retained in the holders until after the animal has been ejected.

Extending back from the fixed arm 54 toward the pivotable arm 56 into a position below the gripper heads 70 and 71 is a lower support and shield element 72 which performs the dual functions of supporting and shielding the hinge portion of the bivalve B. The member 72 may be in the form of an upwardly facing, concave piece, such as one produced by splitting a length of tubing in half.

The dual functions of shielding the bill portion of the shell and keeping the shell from coming open during the heating step are performed by a chain-like assembly 74 constituted by V-shaped elements 76 connected together by links 78 for movement in both vertical and lateral directions. The assembly 74 is hingeably linked to a bracket 79 secured to the movable holder arm 56. The free end of the chain of elements is arranged to be coupled to the fixed arm 54 by a releasable coupling, which is designated generally by the reference numeral 80. Referring back briefly to FIG. 2, the releasable coupling includes a rod 82 slidably carried by the arm 54 by guides 84 and drawn downwardly by a spring 86 attached to the holder bracket element 52. At the upper end of the rod is a part 83 (see FIG. 3) having a series of spaced-apart holes 88 for receiving an angularly related lower leg 90a of a hook or catch 90 carried by the free end of the shield assembly 74. A cam follower piece 92 extending out from an intermediate part of the catch 90 is positioned to engage cam element 94 (see FIG. 1B) after the holder has emerged from the oven and to be forced by it to the left (with respect to FIG. 5) to push the lower piece 90a out of the hole 88 in the rod part 83 and thereby release the shield assembly.

Additional elements of the machine may be best described in connection with the following description of the operation of the machine.

The conveyor 12 is moved at a constant speed so that the holders move to the left, with respect to FIG. 1A, along the lower traverse and then are carried up and around and moved to the right along the upper traverse of the conveyor. Soon after each holder starts along the upper traverse, the movable arm 56 of the holder is rotated counterclockwise by engagement of the cam follower wheel 62 with the cam bar 66 so that the holder is opened to receive a bivalve B. It should be mentioned at this point that the bivalves B should be wet to ensure proper operation of the process. In this exemplary embodiment, no provision has been made for automatic feeding of the bivalves into the holders, the bivalves being placed in the holders by hand. Where the plant in which the machine is used includes a grading step so that substantially uniform sized bivalves can be fed to the machine, automatic delivery equipment can be employed. Otherwise, manual insertion of the bivalve is deemed to be satisfactory.

When the holders open, the bivalves are manually positioned with their hinge or dorsal ends down on the lower shield element 72 of the holder. After the holder closes (when the cam follower 62 leaves the cam 66), the operator pulls the upper shield assembly 74 over the bill portion of the bivalve and secures the catch 90 to the rod 82 by inserting the lower end piece 90a into an appropriate hole 88 in the rod element 83, the rod 82 having first been pulled upwardly to place tension on the spring. The provision of a series of holes 88 will permit bivalves of widely sizes to be readily accommodated in the holder. Moreover, the chain-like construction of the upper shield assembly 74 permits it to accommodate to various shapes and sizes of bivalves. This is of particular importance with oysters which tend to vary considerably in both size and geometry. For example, the shell may in fact be relatively sharply curved, thereby making it advantageous that the shield assembly can be displaced laterally from the vertical plane of the holder.

The holders move on into the oven with the bivalves securely gripped and shielded in their bill and hinge portions. During the major portion of the movement of the holders along the upper traverse of the conveyor, the upper parts of the holders with the bivalves shielded and gripped therein are moved through oven passages 100, the lower end of each oven passage 100 being open through a slot 102 so that the holders can freely pass along through the oven. As will be discussed in more detail hereinafter, the oven is heated to a temperature of between about 1200° F. and 2000° F., the particular temperature depending on a number of factors involving the particular bivalves being handled by the machine. Moreover, the length of the oven is so related to the rate of movement of the bivalves through it that the bivalves reside there for a predetermined time, which can vary between about 2 seconds and about 25 seconds, again depending on the particular bivalves being handled.

The oven 14 may be electrically heated or may be gas or oil fired, but in either case, the walls of the oven passages 100 provide a substantial radiant heating so that the bivalves are exposed not only to the heated atmosphere in the passages but to radiant heat, the radiant heat being the more significant medium of heat transfer.

The affect of the oven temperature and the time which the bivalves reside in the oven are such that the shell is heated to a degree sufficient to singe away the surface tissues by which the animal is fastened to the shell. Nevertheless, the hinge ligament and the bill portion are shielded from the heat so that they will not be seared so that the hinge ligament will be capable of opening the shell and the bill will not be burned closed.

An important part of the process of effecting the release of the animal from the shell involves subjecting the bivalve to shaking motion during at least the latter part of the time in the oven. Preferably, the shaking movement is principally in a generally vertical direction and in the embodiment shown is imparted to the holders by the action of saw-toothed cam bars 101 coacting with cam follower elements 102 on the spring-mounted upper parts 34 of the holder carriers 26. The operation of the cam arrangement is to repeatedly pull the holders down against the force of the springs 36 and then release them so that the spring returns them upwardly. The shaking motion should be vigorous enough to cause the animals to peel away from the shell but not so violent as to tear or bruise the animal. Thus, the detachment or release of the animal from the shell is a result of the combined effects of singeing and mechanical peeling during the stay of the bivalves in the oven.

Referring to FIG. 1B, each bivalve is sprayed with water from a nozzle 110 immediately upon emerging from the oven. It has been found that the spray assists in effecting the opening of the shell, though the precise reason for the beneficial effect of the water spray is not known. Coincident with or in close proximity to the water spray step, the shield structure 74 is released by engagement of the actuator element 92 on the catch 90 with the cam piece 94 (see FIG. 1B) so that the lower, lateral part 90a of the catch is forced out of the hole 88 in the spring loaded coupling rod 82, thereby freeing the shield 94 from wedging engagement with the shell halves. Therefore, the shell is free to open under the action of the hinge ligament, together with the action of the water spray. It will be recalled that only one shell half is gripped by the gripping heads 70 and 71 of the holder arms 54 and 56 so that the opening of the shell may take place freely.

During the major portion of the travel of the holders around the conveyor, they are held in a position substantially perpendicular to the conveyor chain by the tracking in the tracks 50 of the cam arms 46 on each end of the transverse shafts 42. However, beginning soon after the holders emerge from the oven, the track 50 converges toward the conveyor chain 16 so that the cam arms 46 are moved in a direction to pivot the shafts 42 carrying the holders in a counterclockwise direction, with respect to FIG. 1B, thereby cocking the holders back against the torsion springs 45. At a predetermined point along the travel of the holders, the tracks 50 abruptly release the cam arms 56 and permit the springs 45 to pivot the shaft in a clockwise direction to impart a generally downward thrusting motion to the holders and cause the animals M to be ejected or propelled out of the shells S downwardly into a wash tank 112. The outer guide of each track 50 includes a projection 50a (FIG. 1B) which provides not only for the abrupt thrusting motion but also serves to stop the motion sharply; the inertia of the animals, which have already been substantially freed of attachment to the shell, is sufficient to propel them out between the then open shell halves. Thereafter, the holder is returned to its normal position perpendicular to the conveyor and is carried around to the lower traverse. Meanwhile, the animals or meats of the bivalves are suitably washed in the tank 112, or transported to a separate washing tank, and are ready for further processing and packing.

At an appropriate point along the lower traverse of the conveyor, the holders are opened by engagement of the lower cam follower arms 56c of the movable holder arm 56 with the cam 67 (FIG. 1B). The shells S may be dropped onto a conveyor (not shown) for removal and disposal. As the holders move further along the lower traverse of the conveyor, they are preferably cooled by water sprays 120, the sprays also serving to clean away any shell fragments, sand or other contaminants. This completes the cycle of operation of the machine, and the holders are ready to return to the starting point on the upper traverse for loading and another cycle, as will readily be apparent to those skilled in the art.

As mentioned above, the time and temperature conditions required to open the bivalves and release the animals without substantially heating them and permitting them to be recovered alive and in good condition vary considerably, depending upon various factors. First of all, different bivalve species require markedly different times and temperatures because of variations in such things as shell thickness, density, porosity, heat conductivity and the like. For example, oysters should be heated to a temperature of between about 1600° F. and 2000° F. for between approximately 14 and 25 seconds. Little Neck and cherry stone clams are properly treated under temperatures between 1600° F. and 1800° F. and times between 12 and 20 seconds. Scallops are opened under relative low temperatures, say as low as 1200° F. in a time ranging from 2 to 10 seconds.

Within the various species, the variations in times and temperatures may also be relatively large as a result of differences in the shell thicknesses, densities and other properties which may, in turn, arise from such factors as the particular bed in which the bivalves grew, the size and the age of the bivalve. In short, the proper time and temperature conditions must be selected with a view to the particular species, size, age, and the locality or waters from which it is taken. The proper conditions can relatively quickly be determined by experimentation, and experience will show for each particular bivalve crop handled by a processor what the best conditions for successful shucking are.

It will be understood that the embodiment of the invention described above is merely exemplary, and those skilled in the art will be able to make numerous variations and modifications in the method and apparatus of the invention without departing from the spirit and scope of the invention. All such variations and modifications are intended to be included within the scope of the invention as defined in the appended claims.

I claim:
1. Apparatus for shucking bivalves to separate the animals from the shells comprising an oven, means for heating the oven to a predetermined temperature, means movable into the oven for holding the bivalve therein to expose it to the heat for a time sufficient to heat the shell and cause the animal to be released from the shell, means associated with the holder for inhibiting the heating of the hinge and bill portions of the bivalve to prevent them from being seared, and means for imparting a shaking motion to the bivalve while in the oven to effect a mechanical peeling away of the animal in aid of the detaching action of the heat and to prevent it from resting long in any given position in the shell.

2. Apparatus according to claim 1 further comprising transport means for moving the bivalve holding means into and out of the oven and providing a predetermined time in the oven.

3. Apparauts according to claim 2 further comprising means associated with the holding means and transport means for imparting a thrusting or shaking motion to the bivalves after they leave the oven to eject the animals from the shells.

4. Apparatus according to claim 1 wherein the holding means includes means for holding the shells closed while the bivalves are in the oven and releasalbe to permit the shells to open after leaving the oven.

5. Apparatus according to claim 4 wherein the means for holding the shell closed includes an element of the means for inhibiting the heating of the bill portions of the bivalves.

6. Apparatus according to claim 1 wherein the holding means includes releasable gripping members positioned to grasp spaced parts of one shell half only, leaving the other shell half free.

7. Apparatus according to claim 1 wherein the bivalve holding means is arranged to support the bivalve with its hinge end down while in the oven.

8. Apparatus according to claim 7 wherein the bivalve holding means includes a member positioned to support the hinge part of the shell, the said member also constituting the heat inhibiting means.

9. Apparatus according to claim 1 further comprising means for spraying water on the bivalves after they leave the oven to assist in opening them.

10. Apparatus for shucking bivalves to separate the animals from the shells comprising an oven, means for heating the oven to a predetermined temperature within the range of from about 1200° F. to about 2000° F., holder means including releasable members for gripping one shell half only of a bivalve, leaving the other shell half free, with the hinge portion of the bivalve lowermost and the bill portion uppermost when the bivalve is in the oven, transport means carrying the holder means and movable along a predetermined path to move the holders into and out of the oven and to expose the bivalve to the oven heat for a time sufficient to heat the shell and cause the animal to be released from the shell, means carried by the holder means for shielding the hinge and bill portions of the bivalve from the heat to prevent them from searing, means for imparting shaking motion to the bivalve principally along a substantially vertical axis for at least a part of the time in the oven to mechanically peel the animal away from the shell without tearing or bruising it and preventing the animal from resting long at any specific position in the shell, thereby reducing the tendency for heat to be transferred by conduction from the shell to the animal to cause localized burning, and releasable means for holding the shells closed while the bivalves are in the oven and permitting the shells to open after leaving the oven.

11. Apparatus according to claim 10 further comprising means for separating the gripping members of the holder means to receive the bivalve before the holders are transported into the oven.

12. Apparatus according to claim 10 further comprising actuating means along the path of movement of the holder means downstream from the oven for releasing the said means for holding the shells closed.

13. Apparatus according to claim 10 further comprising means associated with the transport means and the holding means for imparting a thrusting or shaking motion to the bivalves after they leave the oven to eject the animals from the then open shells.

14. Apparatus according to claim 10 further comprising means for spraying water on the bivalves after they leave the oven to assist in opening them.

15. Apparatus according to claim 10 further comprising means for spraying water on the bivalves after they leave the oven but before the said means for holding the shells closed is released.

References Cited

UNITED STATES PATENTS

| | | | |
|---|---|---|---|
| 2,942,292 | 6/1960 | Rey | 17—45 |
| 3,070,834 | 1/1963 | Carpenter | 17—45 |
| 3,203,034 | 8/1965 | Matzer et al. | |
| 3,230,580 | 1/1966 | Maruin et al. | 17—45 |
| 3,230,578 | 1/1966 | Maruin et al. | 17—9 |
| 3,320,631 | 5/1967 | Brown. | |

LUCIE H. LAUDENSLAGER, Primary Examiner

U.S. Cl. X.R.

17—48